United States Patent Office 3,478,062
Patented Nov. 11, 1969

3,478,062
CERTAIN TETRAHYDROINDANE DERIVATIVES
Gaston Amiard, Thorigny, Gerard Nomine, Noisy-le-Sec, and Vesperto Torelli, Maisons Alfort, France, assignors to Roussel-Uclaf, Paris, France, a corporation of France
No Drawing. Application July 27, 1966, Ser. No. 569,792, which is a continuation-in-part of application Ser. No. 413,979, Nov. 25, 1964. Divided and this application Feb. 3, 1969, Ser. No. 796,194
Claims priority, application France, Nov. 29, 1963, 955,529
Int. Cl. C07d 5/32; C07c 167/02, 49/54
U.S. Cl. 260—343.3                11 Claims

ABSTRACT OF THE DISCLOSURE

A process for the preparation of novel 1,5-dioxo-4-(carboxymethyl) - 7a-methyl - 5,6,7,7a-tetrahydro-indane, which is a useful intermediate for the total synthesis of steroids and to novel intermediates.

PRIOR APPLICATIONS

The present application is a divisional application of copending, commonly asigned U.S. patent application Ser. No. 569,792 filed July 27, 1966, which in turn is a continuation-in-part application of copending commonly assigned U.S. patent application Ser. No. 413,979 filed Nov. 25, 1964, now abandoned.

OBJECTS OF THE INVENTION

It is an object of the invention to provide novel steroid intermediates of the formula

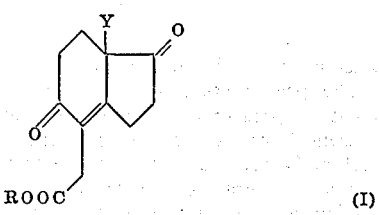

wherein R is selected from the group consisting of hydrogen and lower alkyl radicals and Y is an alkyl radical of 1 to 18 carbon atoms.

It is another object of the invention to provide a novel process for the preparation of the steroid intermediates of Formula I.

These and other objects and advantages of the invention will become obvious from the following detailed description.

THE INVENTION

The novel steroid intermediates of the invention are bicyclic compounds of the formula

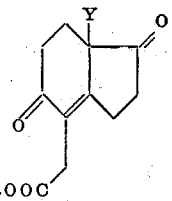

wherein R is selected from the group consisting of hydrogen and a lower alkyl radical and Y is an alkyl radical of 1 to 18 carbon atoms such as methyl, ethyl, propyl, isopropyl, butyl, cetyl, etc.

The process of the invention for the preparation of the $13\beta$-Y-$\Delta^{1,3,5(10)}$-gonatrienes of the formula

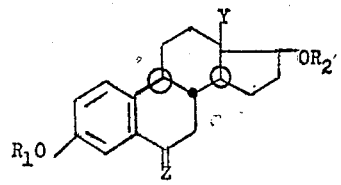

(II)

wherein Y is an alkyl radical of 1 to 18 carbon atoms, $R_1$ is selected from the group consisting of hydrogen and an alkyl radical of 1 to 4 carbon atoms, $R_2$ is selected from the group consisting of hydrogen and an acyl radical of an organic carboxylic acid having 1 to 10 carbon atoms and Z is selected from the group consisting of

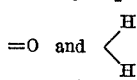

comprises condensing a lower alkyl ester such as the methyl or ethyl ester of 4-oxo-5-hexenoic acid with a 2-Y-cyclopentane-1,3 - dione wherein Y has the above definition in the presence of an alkaline condensation agent, treating the condensation product with an acid or a mixed acid-base as defined by Lewis to form a racemic mixture of the corresponding 1,5-dioxo - 4 - (carboxymethyl) - 7a-Y-5,6,7,7a-tetrahydro-indane which is resolved according to known methods such as those described in Belgian Patent No. 629,251, separating the dextrorotatory 1,5 - dioxo-4-(carboxymethyl)-7a-methyl-5,6,7,7a-tetrahydro-indane, reducing the dextrorotatory 1,5-dioxo-4-(carboxymethyl) - 7a-Y-5,6,7,7a-tetrahydro-indane with an aqueous or aqueous alcoholic alkali metal borohydride to form $1\beta$-hydroxy-5-oxo-4-(carboxymethyl)-7a-Y-5,6,7,7a-tetrahydro-indane, esterifying the latter with an acylating agent of an organic carboxylic acid having 1 to 10 carbon atoms, catalytically hydrogenating the resulting ester in the presence of palladized charcoal to form $1\beta$-acyloxy-5-oxo-4-(carboxymethyl)-7a-Y-3a,4,5,6,7,7a-hexahydro-indane, condensing the latter with a p-lower alkoxy phenyl magnesium bromide to form the corresponding $1\beta$-acyloxy-4-(carboxymethyl)-5 - (p-lower alkoxy phenyl)-7a-Y-3a,4,7,7a-tetrahydro-indane, catalytically hydrogenating the latter in the presence of palladized charcoal to form the corresponding 1β-acyloxy-4-(carboxymethyl) - 5 - (p-lower alkoxyphenyl)-7a-Y-3a,4,5,6,7,7a - hexahydro-indane, cyclizing the latter in the presence of polyphosphoric acid to form 3 - lower alkoxy-13β-Y-17β-acyloxy-$\Delta^{1,3,5(10)}$-gonatriene-6-one, catalytically hydrogenating the latter in the presence of palladized charcoal to form 3-lower alkoxy-13β-Y-17β-acyloxy-$\Delta^{1,3,5(10)}$-gonatriene and simultaneously dealkylating and saponifying the latter in the presence of a strong mineral acid to form 13β-Y-$\Delta^{1,3,5(10)}$-gonatriene-3,17β-diol. The reaction scheme is illustrated in Table I.

TABLE I

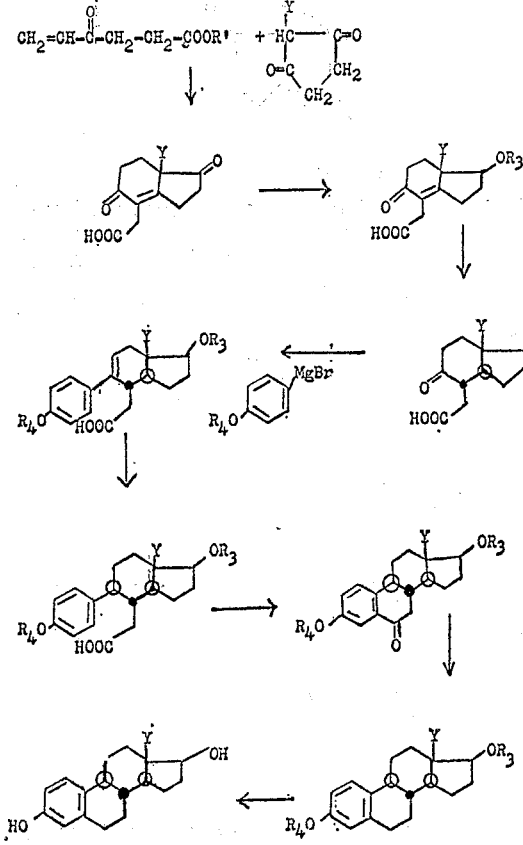

wherein R' is a lower alkyl radical, Y has the above definition, $R_3$ is an acyl radical of an organic carboxylic acid having 1 to 10 carbon atoms and $R_4$ is an alkyl radical of 1 to 4 carbon atoms.

Another method of preparing the 13β-Y-$\Delta^{1,3,5(10)}$-gonatrienes of Formula II comprises condensing a lower alkyl ester such as the methyl or ethyl ester of 4-oxo-5-hexenoic acid with a 2-Y-cyclopentane-1,3-dione wherein Y has the above definition in the presence of an alkaline condensation agent, treating the condensation product with an acid or a mixed acid-base as defined by Lewis to form a racemic mixture of the corresponding 1,5-dioxo-4 - (carboxymethyl) - 7a-Y - 5,6,7,7a-tetrahydro-indane which is resolved according to known methods such as those described in Belgain Patent No. 629,251, separating the dextrorotatory 1,5-dioxo-4-(carboxymethyl)-7a-methyl-5,6,7,7a-tetrahydro-indane, reducing the dextrorotatory 1,5 - dioxo - 4 - (carboxymethyl)-7a-Y-5,6,7,7a-tetrahydro-indane with an aqueous or aqueous alcoholic alkali metal borohydride to form 1-hydroxy-5-oxo-4-(carboxymethyl) - 7a - Y - 5,6,7,7a - tetrahydro-indane, esterfying the latter with an acylating agent of an organic carboxylic acid having 1 to 10 carbon atoms, condensing the resulting ester with a p-lower alkoxyphenyl magnesium bromide to form 1-acyloxy-4-(carboxymethyl)-5-(p-lower alkoxy phenyl) - 7a - Y-7,7a-dihydro-indane, catalytically hydrogenating the latter in the presence of palladized charcoal to form 1-acyloxy - 4 - (carboxymethyl)-5-(p-lower alkoxy phenyl)-7a-Y-3a,6,7,7a-tetrahydro-indane, reducing the latter with lithium in ammonia to form 1-acyloxy-4-(carboxymethyl)-5-(p-lower alkoxy phenyl) - 7a - Y-3a,4,5,6,7,7a-hexahydro-indane, cyclizing the latter in the presence of polyphosphoric acid to form 3-lower alkoxy-13β-Y-17β-acyloxy-$\Delta^{1,3,5(10)}$-gonatriene-6-one, catalytically hydrogenating the latter in the presence of palladized charcoal to form 3-lower alkoxy - 13β - Y-17β-acyloxy-$\Delta^{1,3,5(10)}$-gonatriene and simultaneously dealkylating and saponifying the latter in the presence of a strong mineral acid to form 13β-Y-$\Delta^{1,3,5(10)}$-gonatriene-3,17β-diol. The reaction scheme is illustrated in Table II.

TABLE II

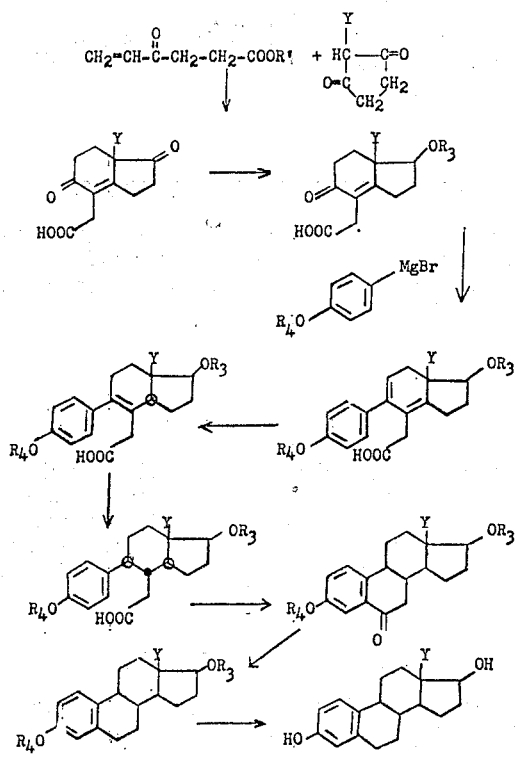

wherein R', Y, $R_3$ and $R_4$ have the above definitions.

The condensation initial step may be effected at elevated temperatures in the presence of a solvent such as benzene hydrocarbons like benzene, toluene, etc., but is preferably effected in the absence of additional solvent at normal temperatures, i.e. not above 40° C. The alkaline condensation agent may serve as the reaction solvent and is preferably a tertiary base such as pyridine, methyl pyridine, triethylamine, etc.

The treatment of the initial condensation products may be effected under anhydrous conditions with acids such as p-toluene sulfonic acids but is preferably effected with aqueous solutions of acids such as hydrochloric acid, hydrobromic acid and sulfuric acids since the yields are higher in the latter case.

In addition to the 1,5-dioxo-4-(carboxymethyl)-7a-Y-5,6,7,7a-tetrahydro-indanes, the reaction product contains a significant amount of epimeric 4-lactones of 4-

(2'-carboxylethyl) - 7,8 - dioxo-4-hydroxy-1-Y-bicyclo [3,2,1]-octane of the formula

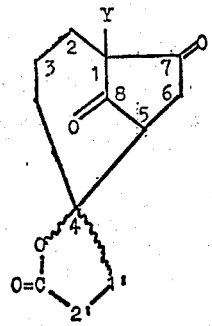

and usually about 2 to 3% of the ester of 1,5-dioxo-4-(carboxymethyl) - 7a-Y-5,6,7,7a-tetrahydro-indane corresponding to the ester of the starting 4-oxo-5-hexenoate ester and can be removed during the recovery of the desired acid.

Examples of suitable 2 - Y - cyclopentane-1,3-dione starting compounds are 2-methyl-cyclopentane-1,3-dione, 2-ethyl-cyclopentane-1,3-dione, 2 - propyl-cyclopentane-1,3-dione, 2 - isopropyl-cyclopentane-1,3-dione, 2-butyl-cyclopentane-1,3-dione, 2 - cetyl-cyclopentane-1,3-dione, etc.

A preferred embodiment of the process of the invention comprises condensing methyl - 4 - oxo-5-hexenoate with 2-methyl-cyclopentane-1,3-dione in the presence of a teritiary base such as pyridine and treating the condensation product with an aqueous acid such as hydrochloric acid to form 1,5 - dioxo-4-(carboxymethyl)-7a-methyl-5,6,7,7a-tetrahydro-indane.

The racemic mixture of 1,5-dioxo-4-(carboxymethyl)-7a-Y-5,6,7,7a-tetrahydro-indane and its enantiomorphs can be converted in their lower alkyl esters.

In the following examples there are described several preferred embodiments to illustrate the invention.

EXAMPLE I

Preparation of 1,5-dioxo-4-(carboxymethyl)-7a-methyl-5,6,7,7a-tetrahydro-indane 17.75 gm. of methyl 4-oxo-5-hexenoate (H. T. Taylor, J. Chem. Soc., 1958, pp. 3922–3924), 100 mg. of hydroquinone and 12.6 gm. of 2-methyl-cyclopentane-1,3-dione in 25 cc. of pyridine were placed in suspension and agitated at room temperature for a period of 24 hours under an atmosphere of nitrogen. The mixture was then evaporated under vacuum in a water bath with a maximum temperature of 40° C., and the residue was taken up in ether and the solution was filtered. The ethereal solution was then evaporated to dryness and the oily residue obtained was heated with 150 cc. of 5 N hydrochloric acid for 2 hours on a steam bath. The solution was then cooled to about 45° C. and ammonium sulfate was added thereto until crystallization began. Next, the solution was iced and vacuum filtered and the residue was washed with water and dried to obtain a mixture of 1,5 - dioxo-4 - (carboxy-methyl)-7a-methyl-5,6,7,7a-tetrahydro-indane and epimeric lactones of 4-(2'-carboxyethyl)-7,8-dioxo-4-hydroxy-1-methyl-bicyclo [3,2,1]-octane.

The said mixture was taken up in 70 cc. of a saturated aqueous solution of sodium bicarbonate and the two epimeric lactones which were insoluble therein were removed by filtration, and may be separated by their differential solubility in chloroform or benzene. The less soluble epimer had a melting point of 202° C. while the more soluble epimer had a melting point of 167° C. The filtrate was acidified with hydrochloric acid to a pH value of 1 and then was iced for 1 hour and vacuum filtered. The residue was washed with water and dried to obtain 13.23 gm. of 1,5-dioxo-4-(carboxymethyl) - 7a-methyl-5,6,7,7a-tetrahydro-indane which after recrystallization from water had a melting point of 200° C.

This product occurred in the from of colorless prisms which were very slightly soluble in ether, acetone, benzene and chloroform, fairly soluble in water and dilute aqueous acids and soluble in dilute aqueous alkalis and in alcohols.

*Analysis.*—$C_{12}H_{14}O_4$: Molecular weight=222.23. Calculated: C, 64.85%; H, 6.35%. Found: C, 64.7%; H, 6.5%.

This compound is not described in the literature.

In order to isolate the methyl ester the hydrochloric acid mother-liquors was first saturated with ammonium sulfate and then extracted with ethyl acetate.

The solvent was distilled off under vacuum and the residue was crystallized from ether. 4 grams of a mixture were obtained, which were subjected to chromatography on 200 gm. of silicagel, whereupon elutions were made first with pure methylene chloride, and then with methylene chloride containing increasing amounts of acetone. The methylene chloride elution fractions containing from 6 to 10% of acetone were combined and evaporated to dryness. The residue from several repeated recrystallizations in ethyl acetate yielded 0.4 gm. of methyl ester of 1,5-dioxo - 4-(carboxymethyl) - 7a-methyl-5,6,7,7a-tetrahydro-indane having a melting point of 145° C.

The product occurred in the form of colorless prisms which were slightly soluble in water and diluted aqueous acids, fairly soluble in ether and soluble in alcohols, acetone, benzene and chloroform.

*Analysis.*—$C_{13}H_{16}O_4$=236.26. Calculated: C, 66.08%; H, 6.83%. Found: C, 65.9%; H, 6.7%.

This compound is not described in the literature.

EXAMPLE II

Preparation of the methyl ester of 1,5-dioxo-4-(carboxymethyl)-7a-methyl-5,6,7,7a-tetrahydro-indane (A) Esterification with methanol.—A solution of 3 gm. of 1,5-dioxo-4-(carboxymethyl)-7a-methyl-5,6,7,7a-tetrahydro-indane prepared in Example I in 50 cc. of methanol was saturated with gaseous hydrochloric acid and then was refluxed for a period of 2 hours. The methanol was evaporated under vacuum and the residue obtained was redissolved in ethyl acetate. The said solution was washed first with water, then with a solution of sodium bicarbonate and again with water, then with a solution of sodium bicarbonate and again with water, dried and distilled under vacuum. The resulting residue was recrystallized from 15 cc. of ethyl acetate to obtain 2.4 gm. (75% yield) of the methyl ester of 1,5-dioxo-4-(carboxymethyl)-7a-methyl-5,6,7,7a,-tetrahydroindane which had a melting point of 145° C.

(B) Esterification with diazomethane.—Under agitation, 7 cc. of a methylene chloride solution containing 30 gm./liter of diazomethane were added dropwise to a suspension of 1.11 gm. of 1,5-dioxo-4-(carboxymethyl)-7a-methyl-5,6,7,7a-tetrahydroindane in 15 cc. of methylene chloride cooled on an ice bath. A few drops of acetic acid were then added to destroy the slight excess of diazomethane and the solvent was removed under vacuum. The residue was crystallized in 6 cc. of ethyl acetate to obtain 1.07 gm. (90% yield) of the methyl ester of 1,5-dioxo-4-(carboxymethyl)-7a-methyl-5,6,7,7a-tetrahydroindane having a melting point of 145° C.

EXAMPLE III (1) Preparation of 3-methoxy-$\Delta^{1,3,5(10)}$-estratriene-17$\beta$-ol STEP A.—1,5-DIOXO-4-(CARBOXYMETHYL)-7a-METHYL-5,6,7,7a-TETRAHYDROINDANE (a) Preparation of D(—) and L(+)-threo-1-p-nitrophenyl-2-N,N-dimethylamino-propane-1,3-dilos.—A mixture of 50 gm. of D(—) threo-1-p-nitrophenyl-2-amino-propane-1,3-diol, (prepared according to the method of Controulis et al., J.A.C.S., vol. 71, p. 2463), 50 cc. of 98% formic acid and 50 cc. of 30% formol was heated on a steam bath for about 3 hours, and then the reaction mixture was distilled to dryness under vacuum. The oily residue was dissolved in 150 cc. of water and after 40 cc. of 22° Bé ammonium hydroxide were added, the mixture was maintained at a temperature of approximately 80° C. for about 15 minutes. Then 60 cc. more of ammonium hydroxide were added at a high temperature. The whole mixture was then allowed to stand at a low temperature for about 1 hour. The formed crystals were vacuum filtered, washed with water and dried in the complete absence of light to obtain 53.5 gm. of D(—) threo-1-p-nitrophenyl-2-N,N-dimethylaminopropane-1,3-diol. 121.6 gm. of the raw product was purified by dissolution in 2 N hydrochloric acid, followed by treatment with animal black and recrystallization by addition of 1 N sodium hydroxide to obtain 113 gm. of pure product, having a melting point of 101° C. and a specific rotation of $[\alpha]_D = -26° \pm 1°$ (c.=1% in ethanol).

The product was slightly soluble in water and soluble in dilute aqueous acids and alcohols.

Analysis.—$C_{11}H_{16}O_4N_2$: Molecular weight=240.25. Calculated: C, 54.99%; H, 6.71%; N, 11.66%. Found: C, 55.2%; H, 7.0%; N, 11.5%.

This compound is not described in the literature.

L(+)-threo-1-p-nitrophenyl-2-N, N-dimethylaminopropane-1,3-diol was prepared by starting from L(+)-threo-1-p-nitrophenyl-2-aminopropane-1,3-diol according to the same method. The said product had a melting point of 101° C. and a specified rotation of $[\alpha]_D = +26° \pm 1°$ (c.=1% in ethanol).

The product was slightly soluble in water and soluble in dilute aqueous acids and alcohols.

Analysis.—$C_{11}H_{16}O_4N_2$: Molecular weight=240.25. Calculated: C, 54.99%; H, 6.71%; N, 11.66%. Found: C, 55.0%; H, 6.7%; N, 11.4%.

This compound is not described in the literature.

(b) Resolution of 1,5-dioxo-4-carboxymethyl-7a-methyl-5,6,7,7a-tetrahydroindane.—Under reflux, 22.2 gm. of racemic 1,5-dioxo-4-carboxymethyl-7a - methyl - 5,6,7,7a-tetrahydroindane from Example I and 24 gm. of D(—) threo-1-p-nitro-phenyl-2-N, N-dimethylaminopropane-1,3-diol were dissolved in 100 cc. of ethyl acetate containing 2% water and 7 cc. of ethanol. Crystallization was started and the solution was cooled to room temperature over a period of about two hours, and then the solution was allowed to stand for 12 hours at a low temperature. The crystals formed were vacuum filtered, washed several times with ethyl acetate containing 1% of water and finally dried to obtain 21.84 gm. of the desired salt, having a melting point of about 100° C. and a specific rotation of $[\alpha]_D = +78° \pm 1°$ (c.=1 in water).

The product was soluble in water and alcohols and slightly soluble in ethyl acetate.

This compound is not described in the literature.

(2) Preparation of dextrorotatory 1,5-dioxo-4-(carboxymethyl)-7a-methyl-5,6,7,7a-tetrahydroindane Under an atmosphere of nitrogen, 24 gm. of dextrorotatory salt of D(—) threo-1-p-nitrophenyl-2-N,N-dimethyl-aminopropane-1,3-diol with dextrorotatory 1,5-dioxo-4-(carboxymethyl) 7a - methyl - 5,6,7,7a,-tetrahydroindane were introduced into 100 cc. of ice water and then 50 cc. of N sodium hydroxide were slowly added thereto under agitation. The reaction mixture was filtered and the filtrate was recovered, washed repeatedly with ethyl acetate, then acidified with concentrated hydrochloric acid. Ammonium sulfate was added up to the point of saturation and the mixture was extracted several times with methylene chloride. The extracts obtained were combined, dried over magnesium sulfate, treated with animal black and dried under vacuum. The residue was taken up in 20 cc. of toluene and allowed to crystallize. The formed crystals were vacuum filtered, washed with cold toluene and dried to obtain 10.5 gm. of dextrorotatory 1,5-dioxo-4-(carboxymethyl)-7a-methyl-5,6,7,7a-tetrahydroindane having a melting point of 129° C. and a specific rotation of $[\alpha]_D = +225° \pm 1°$ (c.=0.5% in water).

The product was slightly soluble in toluene, fairly soluble in water and soluble in the alcohols and chloroform.

This compound is not described in the literature.

Step B.—Preparation of Dextrorotatory 1β-hydroxy-4β-(carboxymethyl)-5-oxo-7aβ-methyl - 5,6,7,7a - tetrahydroindane Under an atmosphere of nitrogen, 6.75 gm. of dextrorotatory 1,5-dioxo-4β-(carboxymethyl)-7aβ-methyl-5,6,7,7a-tetrahydroindane were dissolved in the quantity exactly necessary of an aqueous 2 N sodium hydroxide and the solution was cooled to 0° C. Within 10 minutes at a temperature of about 0° C., a solution of 0.310 gm. of commercial sodium borohydride in 1.5 cc. of ice water was introduced therein. The mixture was agitated for 2 minutes after the introduction was completed, then acidified with concentrated aqueous hydrochloric acid solution. The mixture was held for 1 hour at 0° C., vacuum filtered, washed with ice water and dried to obtain 6.64 gm. of dextrorotatory 1β-hydroxy-4β-(carboxymethyl)-5-oxo-7aβ-methyl-5,6,7,7a-tetrahydroindane having a melting point of 194° C. A portion of this product was purified by crystallization from a mixture of ethyl acetate and alcohol, followed by recrystallizaton from water to obtain a product with a melting point of 194° C. and a specific rotation of $[\alpha]_D = 32° \pm 1°$ (c.=0.5% in ethanol).

Analysis.—$C_{12}H_{16}O_4$: Molecular weight=224.25. Calculated: C, 64.27%; H, 7.19%. Found: C, 64.1%; H, 7.3%.

This compound is not described in the literature.

Step C.—(a) Preparation of the lactone of dextrorotatory 1β - acetoxy - 5 - hydroxy - 4α - (carboxymethyl)- 7aβ-methyl-3aα, 4β,7,7a-tetrahydroindane In a hydrogenation vessel, 2.625 gm. of dextrorotatory 1β - hydroxy - 4β - (carboxymethyl) - 5 - oxo - 7aβ-methyl-5,6,7,7a-tetrahydroindane were dissolved in a mixture of 25 cc. of acetone and 6.5 cc. of water. 1.5 gm. of palladized talc containing 1.9% of palladium was added to the mixture and the apparatus was purged, after which the mixture was agitated under an atmosphere of hydrogen at room temperature until the absorption of hydrogen was completed. In this manner, the theoretic quantity of hydrogen was absorbed within 7 hours. The catalyst was removed by filtration, and the filtrate was concentrated to dryness. 1.4 gm. of anhydrous sodium acetate and 50 cc. of acetic anhydride were added to the residue obtained, and the mixture was then brought to and maintained at reflux for 2 hours. Thereafter, the reaction mixture was concentrated to dryness under reduced pressure and a mixture of benzene and ether was added to the residue. The solution was successively washed first with ice water, then with a saturated aqueous solution of sodium bicarbonate and finally again with ice water. The solution was dried and concentrated to dryness. The residue was purified by subjecting it to chromatography through a column of silica gel to obtain 0.620 gm. of the lactone of dextrorotatory 1β-acetoxy-5-hydroxy - 4α - (carboxymethyl) - 7aβ - methyl - 3aα, 4β,7,7a-tetrahydroindane having a melting point of 125° C. and a specific rotation of $[\alpha]_D = +60° \pm 1°$ (c.=0.6% in chloroform).

This product is not described in the literature.

(b) Hydrolysis to dextrorotatory 1β - hydroxy - 4 - (carboxymethyl) - 5 - oxo - 7aβ - methyl - 3aα,4β,5,6,7,7a-hexahydroindane.

0.850 gm. of lactone of dextrorotatory 1β - acetoxy-5-hydroxy - 4α - (carboxymethyl) - 7aβ - methyl - 3aα, 4β,7,7a-tetrahydroindane was dissolved in a mixture of 5 cc. of 2 N sodium hydroxide and 1 cc. of ethanol. The solution was heated to reflux under agitation and the reflux was maintained for 30 minutes. The reaction mixture was then cooled to 0° C. and a concentrated solution of hydrochloric acid was added dropwise until a pH value of 1 was attained. The solution was saturated with ammonium sulfate and the aqueous phase was extracted with ethyl acetate. The extracts were combined and the solution obtained was dried and concentrated to dryness under reduced pressure. The residue was triturated at a high temperature in a mixture of ethyl ether and isopropyl ether and the mixture was vacuum filtered and dried to obtain 0.675 gm. of dextrorotatory 1β-hydroxy - 4 - (carboxymethyl) - 5 - oxo - 7aβ - methyl-3aα,4β,5,6,7,7a-hexahydroindane having a melting point of 150° C.

This compound is new.

Step D.—Preparation of 1β - formyloxy - 4 - (carboxymethyl) - 5 - oxo - 7aβ - methyl - 3aα,4β,5,6,7,7a-hexahydroindane For a period of 30 minutes, 2.75 gm. of 1β-hydroxy-4 - (carboxymethyl) - 5 - oxo - 7aβ - methyl - 3aα,4β,5,6,7,7a-hexahydroindane in 10 cc. of anhydrous formic acid and 0.20 gm. of p-toluene sulfonic acid were heated over a steam bath. At the end of this period, the solution was cooled and 50 cc. of a solution containing 20% of sodium formate were added and 1β - formyloxy-4-(carboxymethyl) - 5 - oxo - 7aβ - methyl - 3aα,4β,5,6-7,7a-hexahydroindane precipitated therefrom. The solution was kept in a refrigerator for 1 hour, then vacuum filtered, washed first with sodium formate, then with ice water and finally dried. The product was recrystallized at high and low temperatures from ethyl acetate. The product obtained occurred in the form of colorless, prismatic needles which were soluble in most of the organic solvents, in water and in dilute alkaline solutions.

This compounds is new.

Step E.—Preparation of 1β - hydroxy - 4 - (carboxymethyl) - 5 - p - methoxy - phenyl - 7aβ - methyl-3aα,4β,7,7a - tetrahydroindane 2.5 gm. of magnesium were introduced into 40 cc. of tetrahydrofuran and after the mixture was heated to 30° C., about 10% of a solution of 18.7 gm. of p-bromoanisol in 27 cc. of tetrahydrofuran were added thereto. The mixture was agitated, maintained at +30° to 35° C., and after the rest of the p-bromoanisol-tetrahydrofuran solution was added, the reaction mixture was heated at 30°–35° C. for 45 minutes. Next the reaction mixture was allowed to stand for 2 hours, then held at a temperature of 0° C. for 1 hour and finally returned to room temperature to obtain a solution of 1.01–1.2 N p-anisol magnesium bromide.

First, 5 cc. of tetrahydrofuran, then a solution of 340 mg. of 1β-formyloxy - 4 - (carboxymethyl) - 5 - oxo-7aβ - methyl - 3aα,4β,5,6,7,7a - hexahydroindane in 4 cc. of tetrahydrofuran were added to 10 cc. of the said magnesium solution, cooled to +10° C. and the mixture was agitated for 30 minutes and then returned to room temperature. Next, the reaction mixture was poured over a mixture of ice and 1.2 cc. of hydrochloric acid. The reaction mixture was extracted with ethyl acetate and the organic phase was washed with water and extracted with a saturated aqueous solution of sodium bicarbonate. The bicarbonate phase was acidified, saturated with ammonium sulfate and finally extracted with a mixture of ethyl acetate and tetrahydrofuran. The organic phase was dried and evaporated to dryness to obtain 340 mg. of raw product which was dissolved in 3.4 cc. of acetic acid. Then 0.7 cc. of a mixture of acetic acid and boron trifluoride was added and the solution was allowed to stand for 45 minutes at room temperature. Then it was poured over ice and extracted with methylene chloride. The organic phase was washed with water and extracted with N sodium hydroxide and the alkaline phase was acidified and filtered. The precipitate was vacuum filtered and washed with water, and dissolved in 1.5 c. of ethanol.

3 cc. of water were added to the solution, which was iced and vacuum filtered to obtain 110 mg. of 1β-hydroxy - 4 - (carboxymethyl) - 5 - p - methoxyphenyl-7aβ - methyl - 3aα,4β,7,7a - tetrahydroindane, having a melting point of 173° C. By diluting the mother liquors with water, a second yield of 18 mg. of product was obtained which gave a total yield of 29%.

This compound is new.

Infra-red spectra.—Presence of —OH, of —COOH and of p-methoxyphenyl

Ultra-violet spectra (in ethanol)

λ max. at 225 mμ _____ ε=9,469
λ max. at 263–264 mμ _____ ε=19,700

Characterization in the form of its methyl ester 200 mg. of 5-p-methoxyphenyl-1β-hydroxy-4-(carboxymethyl) - 7aβ - methyl - 3aα,4β,7,7a - tetrahydroindane were dissolved in 2 cc. methylene chloride and at a temperature of 0° C., 4 cc. of a solution containing 2% of diazomethane in methylene chloride were added thereto. After the mixture was allowed to stand for 15 minutes, the excess diazomethane was destroyed by the addition of a few drops of acetic acid. The mixture was washed first with water, then with sodium bicarbonate, dried over magnesium sulfate and evaporated to dryness. The obtained residue was redissolved in methylene chloride and the solution was subjected to chromatography through magnesium silicate and eluted with a mixture of methylene chloride and methanol to obtain 220 mg. of the methyl ester of the starting product. The infrared spectra showed the presence of a hydroxyl, of an ester function and of an aromatic ring. The NMR spectra confirmed the presence of the double bond in 9(11) [H11 ethylenic proton at 327 Hz.].

This compound is new.

Step F.—Preparation of 5-p-methoxyphenyl-1β-hydroxy-4 - (carboxymethyl) - 7aβ - methyl - 3aα,4β,5,6,7,7a-hexahydroindane A catalyst was prepared from 1.8 gm. of activated carbon, 0.9 gm. of potassium acetate, 180 cc. of water and 0.9 cc. of 20% palladium chloride solution. The catalyst was completely hydrogenated. The palladium catalyst was carefully vacuum filtered, washed first with water, then with ethanol and then the catalyst was introduced into a hydrogenation vessel. 3.6 gm. of 5-p-methoxyphenyl-1β-hydroxy - 4 - (carboxymethyl) - 7aβ - methyl - 3aα,4β,7,7a-tetrahydroindane in 216 cc. of ethanol were added thereto. A stream of hydrogen was passed through the solution under agitation until 250 cc. of hydrogen were absorbed. Next, the vessel was purged with nitrogen and the catalyst was separated, vacuum filtered and rinsed with ethanol. The ethanol solutions were combined and distilled to dryness under vacuum. The residue was taken up in 11 cc. of hot isopropyl ether and by cooling and icing 5 - p - methoxy phenyl - 1β - hydroxy - 4 - (carboxy) - 7aβ - methyl - 3aα,4β,5,6,7,7a - hexahydroindane crystallized therefrom. The crystals were separated, vacuum filtered, washed with iced isopropyl ether and finally dried to obtain 3.14 gm. of the product in hexagonal lamella. For the purpose of analysis, the product was recrystallized from acetone and water. The infrared spectra showed the presence of a hydroxyl group, a carboxyl group and an aromatic ring.

Ultraviolet spectra (in ethanol)

λ max. 224–225 mμ _____ ε=11,200
λ max. 277–278 mμ _____ ε=1,700
λ max. 284 mμ _____ ε=1,450 absence of a conjugated double bond.

NMR spectra in accord with the structure.
hydrogen in the 9a position.

1β - hydroxy - 5 - p - methoxyphenyl - 4 - (carboxymethyl) - 7aβ - methyl - 3aα,4β,5,6,7,7a - hexahydroindane occurred in the form of colorless crystals which were soluble in dilute aqueous alkalis, alcohols and acetone, slightly soluble in ether and insoluble in water.

This compound is new.

Step G.—Preparation of 1β-acetoxy-4-(carboxymethyl)- 5 - p - methoxy - phenyl - 7aβ - methyl - 3aα,4β,5,6, 7,7a-hexahydroindane 1 gm. of 1β-hydroxy-4-(carboxymethyl)-5-p-methoxyphenyl - 7aβ - methyl - 3aα,4β,5,6,7,7a - hexahydroindane was dissolved in 25 cc. of pyridine and while cooling the solution to between 0° and 5° C., 1 cc. of acetic anhydride was added thereto. Next, the mixture was agitated for 15 minutes, and then poured into ice water. After standing for 1 hour, the reaction mixture was filtered and the precipitate formed was vacuum filtered and washed first with aqueous sodium bicarbonate, then with water until the wash waters were neutral, and finally dried to obtain 1.06 gm. of 1β-acetoxy-4-(carboxymethyl)-5-p-methoxyphenyl - 7aβ - methyl - 3aα,4β,5,6,7,7a - hexahydroindane.

The pure product was prepared by recrystallization from a mixture of methylene chloride and isopropyl ether by concentration. The product crystallized in the form of tetragonal prisms, having a melting point of 157°–159° C.

The infra-red spectra showed absence of hydroxyl group, presence of a carboxyl group, presence of an acetoxy group and presence of an aromatic ring. The product obtained was soluble in alcohol and acetone, slightly soluble in ether and insoluble in aqueous media and was decomposed by aqueous alkalis.

Step H.—Preparation of 3-methoxy-17β-acetoxy-$\Delta^{1,3,5(10)}$-estratriene-6-one 1.50 gm. of 1β-acetoxy-4-(carboxymethyl)-5-p-methoxy - phenyl - 7aβ - methyl - 3aα,4β,5,6,7,7a - hexahydroindane were dissolved in 5 cc. of syrupy phosphoric acid (d=1.75) under light heating. Then 6.25 gm. of phosphoric anhydride were added in small portions under constant vigorous agitation. The temperature was increased to 100° C. and the reaction mixture was heated over a period of 1 hour. Thereafter, the mixture was cooled and ice was added thereto and 3-methoxy-17β-acetoxy - $\Delta^{1,3,5(10)}$ - estratriene - 6 - one precipitated. The precipitate was recovered by filtration, washed first with water, then with aqueous sodium bicarbonate and again with water. The product was then purified by recrystallization from hot and cold alcohol to obtain 0.67 gm. of 3-methoxy - 17β - acetoxy - $\Delta^{1,3,5(10)}$ - estratriene - 6 - one in the form of colorless, thin plates, having a melting point of 114° C.

The ketone function was characterized by formation of a dinitrophenyl hydrazone which was obtained after dissolution of 0.50 gm. of 3-methoxy-17β-acetoxy-$\Delta^{1,3,5(10)}$-estratriene-6-one in tetrahydrofuran, by the addition first of 0.2 cc. of hydrochloric acid and by the dropwise addition of 10 cc. of a solution of dinitrophenyl hydrazine in ethanol. After separation and purification according to the usual processes, 0.55 gm. of the dinitrophenyl hydrazone having a melting point of 265° C. were recovered.

Step I.—Preparation of 3-methoxy-$\Delta^{1,3,5(10)}$-estratriene-17β-ol-6-one 0.1000 gm. of 3-methoxy-17β-acetoxy-$\Delta^{1,3,5(10)}$-estratriene-6-one was dissolved in 20 cc. of ethanol and 10 cc. of an N-ethanol solution of potassium hydroxide were added. Then the mixture was agitated for 1 hour at room temperature and after, 20 cc. of water were added, the reaction mixture was vigorously agitated, which resulted in the precipitation of 3-methoxy-$\Delta^{1,3,5(10)}$-estratriene-17β-ol-6-one. The reaction mixture was then extracted three times with 10 cc. of isopropyl ether and the ether phases were combined, washed with water, dried and evaporated to dryness under reduced pressure. The 3-methoxy-$\Delta^{1,3,5(10)}$-estratriene-17β-ol-6-one was purified by dissolution in a minimum of warm isopropyl ether. 3-methoxy-$\Delta^{1,3,5(10)}$-estratriene-17β-ol-6-one was separated by means of refrigeration. The product was left in the refrigerator overnight then filtered, washed with water and dried under vacuum to obtain the product in the form of colorless crystals with a melting point of 81° C. and then 132°–135° C.

This product is identical to that described in U.S. Patent No. 2,974,151.

Step J.—Preparation of 3-methoxy-$\Delta^{1,3,5(10)}$-estratriene-17β-ol(3-methyl ether of estradiol)

At a temperature of 40° C., 10 gm. of activated carbon were suspended in water and after a 1% solution of Pt Cl₄ in hydrochloric acid was added, the suspension was freely alkalized by addition of sodium hydroxide. The precipitate formed was isolated, washed repeatedly with water and alcohol and then suspended in 100 cc. of ethyl alcohol. 0.50 gm. of 3-methoxy-$\Delta^{1,3,5(10)}$-estratriene-17β-ol-6-one was dissolved in 25 cc. of ethanol and 100 cc. of the catalyst were added thereto. The atmosphere in the vessel was purged with nitrogen and then a stream of hydrogen was passed through the suspension for a period of 2 hours at room temperature. Thereafter, the solution was filtered and the catalyst was washed three times with alcohol. The alcohol extracts were combined and evaporated to dryness to obtain 3-methoxy-$\Delta^{1,3,5(10)}$-estratriene-17β-ol which when purified by recrystallization from isopropyl ether-petroleum ether had a melting point of 120–121° C. and a specific rotation of $[\alpha]_D = +76° \pm 3°$ (c.=0.5% in chloroform).

The product is identical to that described by Wilds et al. [J. of Am. Soc., vol. 75 (1943), p. 5366].

We claim:

1. A process for the preparation of 1,5-dioxo-4-(carboxymethyl)-7a-methyl - 5,6,7,7a-tetrahydro-indane which comprises condensing a lower alkyl ester of 4-oxo-5-hexenoic acid with 2-methyl-cyclopentane-1,3-dione in the presence of an alkaline condensation agent and treating the condensation product with an aqueous mineral acid to form 1,5-dioxo-4-(carboxmethyl)-7a-methyl-5,6,7,7a-tetrahydro-indane.

2. The process of claim 1 wherein 1,5-dioxo-4-(carboxymethyl) - 7a-methyl-5,6,7,7a-tetrahydro-indane is esterified with a lower alkanol.

3. The process of claim 1 wherein 1,5-dioxo-4-(carboxymethyl)-7a-methyl-5,6,7,7a-tetrahydro-indane is reacted with diazomethane to form the methyl ester of 1,5-dioxo-4-(carboxymethyl) - 7a-methyl-5,6,7,7a-tetrahydroindane.

4. A process for the preparation of dextrorotatory 1,5-dioxo-4-(carboxymethyl) - 7a-methyl-5,6,7,7a-tetrahydroindane which comprises condensing a lower alkyl ester of 4-oxo-5-hexenoic acid with 2-methyl-cyclopentane-1,3-dione in the presence of an alkaline condensation agent, treating the condensation product with an aqueous mineral acid to form a racemic mixture of 1,5-iodoxo-4-(carboxymethyl)-7a-methyl-5,6,7,7a-tetrahydroindane, resolving this mixture into its enantiomorphs, and recovering the dextrorotatory 1,5 - dioxo-4-(carboxymethyl)-7a-methyl-5,6,7,7a-tetrahydroindane.

5. Bicyclic compounds of the formula

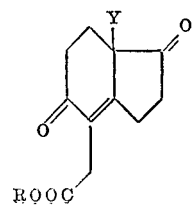

wherein R is selected from the group consisting of hydrogen and a lower alkyl radical and Y is an alkyl radical of 1 to 18 carbon atoms.

6. A compound of claim 5 selected from the group consisting of racemic 1,5-dioxo-4-(carboxymethyl)-7a-methyl-5,6,7,7a-tetrahydroindane and its enantiomorphs, dextrorotatory melting point 129° C. $[\alpha]_D^{20} = +255° \pm 1$ (c.=0.5% water) and levorotatory melting point 129° C. $[\alpha]_D^{20} = -255° + 1$ (c.=0.5% water).

7. Bicyclic compounds of the formula

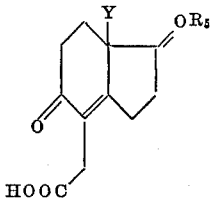

wherein Y is an alkyl radical of 1 to 18 carbon atoms, and $R_5$ is selected from the group consisting of hydrogen and an acyl radical of an organic carboxylic acid having 1 to 10 carbon atoms.

8. The compounds of claim 7, wherein Y is the methyl radical.

9. Bicyclic compounds of the formula

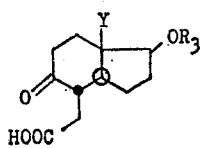

wherein Y is an alkyl radical of 1 to 18 carbon atoms, and $R_3$ is hydrogen or an acyl radical of an organic carboxylic acid having 1 to 10 carbon atoms.

10. The compounds of claim 9, wherein Y is the methyl radical.

11. A tricyclic compound having the formula

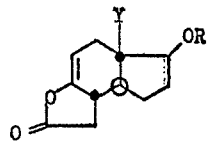

wherein R is selected from the group consisting of hydrogen and acyl radical of an organic carboxylic acid having from 1 to 10 carbon atoms and Y is an alkyl radical of 1 to 18 carbon atoms.

References Cited

UNITED STATES PATENTS 3,185,708   5/1965   Mims _____ 260—343.3

ALEX MAZEL, Primary Examiner

A. M. T. TIGHE, Assistant Examiner

U.S. Cl. X.R.

260—340.6, 397.5, 468, 488, 514, 586, 999